United States Patent [11] 3,615,603

[72] Inventors Masakuni Iwama;
  Isaburo Inoue; Teruo Hanzawa; Kenro Sakamoto; Takaya Endo, all of Tokyo, Japan
[21] Appl. No. 748,236
[22] Filed July 29, 1968
[45] Patented Oct. 26, 1971
[73] Assignee Konishiroku Photo Industry Co., Ltd.
[32] Priority July 27, 1967
[33] Japan
[31] 42/47871

[54] LIGHT-SENSITIVE COLOR-PHOTOGRAPHIC SILVER HALIDE MATERIAL
8 Claims, No Drawings

[52] U.S. Cl. ................................................. 96/100
[51] Int. Cl. ................................................. G03c 1/40
[50] Field of Search .................................... 96/100

[56] References Cited
UNITED STATES PATENTS
3,383,214 5/1968 Anderson .................. 96/100 X
3,458,315 7/1969 Loria ........................ 96/56.2
FOREIGN PATENTS
634,669 9/1964 Belgium .................... 96/100
1,052,488 12/1966 Great Britain ............

Primary Examiner—Norman G. Torchin
Assistant Examiner—John L. Goodrow
Attorneys—Harry C. Bierman, Jordan B. Bierman and Bierman & Bierman ABSTRACT: A yellow-forming component or color coupler for use in silver halide emulsions in light-sensitive color photography has the general formula

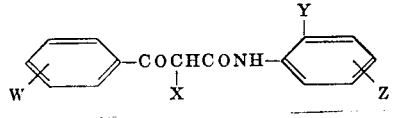

wherein X is a hydrogen atom or a halogen atom; Y is a hydrogen atom, a lower alkoxy group, an aryloxy group or a halogen atom; W is

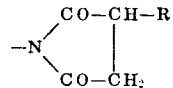

a hydrogen atom or a lower alkoxy group; and Z is

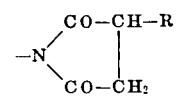

a hydrogen atom or a lower alkoxycarbonyl group, provided either one of z and w is always

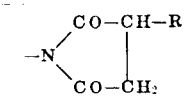

and both of them cannot be

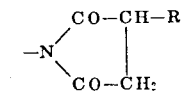

LIGHT-SENSITIVE COLOR-PHOTOGRAPHIC SILVER HALIDE MATERIAL

This invention relates to light-sensitive color-photographic materials. More particularly, the invention relates to light-sensitive color-photographic materials containing, as a so-called protected coupler which is a water-insoluble or difficultly water-soluble coupler which is to be dissolved in a water-immiscible high-boiling solvent and to be emulsified and dispersed in an emulsion, a yellow coupler represented by the general formula

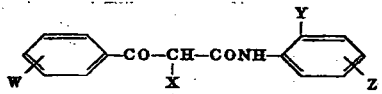

wherein X is a hydrogen atom or a halogen atom; Y is a hydrogen atom, a lower alkoxy group, an aryloxy group or a halogen atom; W is

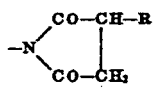

a hydrogen atom or a lower alkoxy group; and Z is

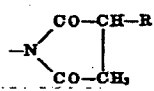

a hydrogen atom or a lower alkoxycarbonyl group, provided either one of Z and W is always

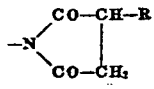

and both of them cannot be

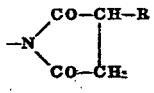

at a same time, where R is an aliphatic hydrocarbon residue having eight to 20 carbon atoms.

In order to be usable for industrial purposes, protected couplers are required to satisfy, in general, the following conditions:

1. The couplers should be those which are high in purity and which can be prepared according to a simple process from easily obtainable inexpensive materials.
2. The couplers and dyes formed by the color development thereof should be well soluble in high-boiling solvents, such as tricresyl phosphate, dibutyl phthalate and the like, to give high-concentration solutions.
3. The couplers should have no such detrimental effects as fog, desensitization, etc. on silver halide emulsions.
4. The couplers should be such that even after dispersing in silver halide emulsions and after application to supports and drying, they do not crystallize and give stable light-sensitive layers.
5. The couplers should be favorable in color-developing property, be excellent in spectral absorption characteristics of color dye image, and be fast to heat light, humidity, etc.

In order to satisfy the above requirements, many studies have heretofore been made and various couplers have been proposed. However, the actual circumstances are such that there is no coupler which can satisfy the above-mentioned requirements.

For example, the known coupler represented by the formula

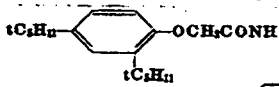

which is disclosed in U.S. Pat. No. 2,875,057, is excellent in solubility for high-boiling solvents, but is quite expensive, and is relatively high in melting point so that a part of the coupler tends to deposit when used in a high-concentration state.

Further, the known coupler of the formula

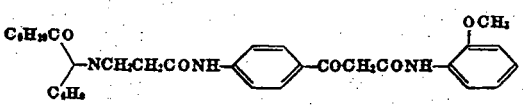

which is described in Japanese Pat. No. 2,837/64, has been more improved in solubility for high-boiling solvents than the coupler disclosed in said U.S. Pat. No. 2,875,057, but is expensive since the lipophilic component is synthesized through several steps.

In view of the above-mentioned actual circumstances, the present inventors made various studies to find that the compounds represented by the aforesaid general formula have excellent characteristics which satisfy the above-mentioned requirements.

That is, the yellow protected couplers employed in the present invention have the following characteristics:

1. They are quite easily soluble in such high-boiling solvents as dibutyl phthalate, tricresyl phosphate, etc. Accordingly, the amounts of high-boiling solvents for the couplers can be reduced, and high-concentration stable dispersions are obtainable.
2. They are low in melting point and hence do not crystallize even in emulsions or in films formed by application and drying thereof.
3. The dye images thereof have excellent spectral absorption characteristics and are fast to light, heat, humidity, etc.

Moreover, they can be easily prepared by merely dehydrating and ring-closing alkali-soluble succinic acid monoamide type couplers having nondiffusing groups which are produced on commercial scale by those skilled in the art. Accordingly, they are markedly useful as protected couplers which have greatly improved the drawbacks of known couplers. It is considered that such excellent characteristics as mentioned above are ascribable to the action of long chain alkyl succinimido group.

Typical examples of the yellow couplers employed in the present invention which are represented by the aforesaid general formula are shown below, but the compounds usable in the present invention are by no means limited thereto.

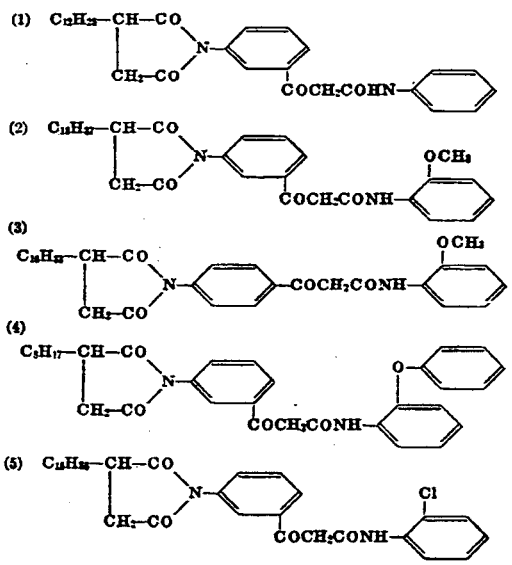

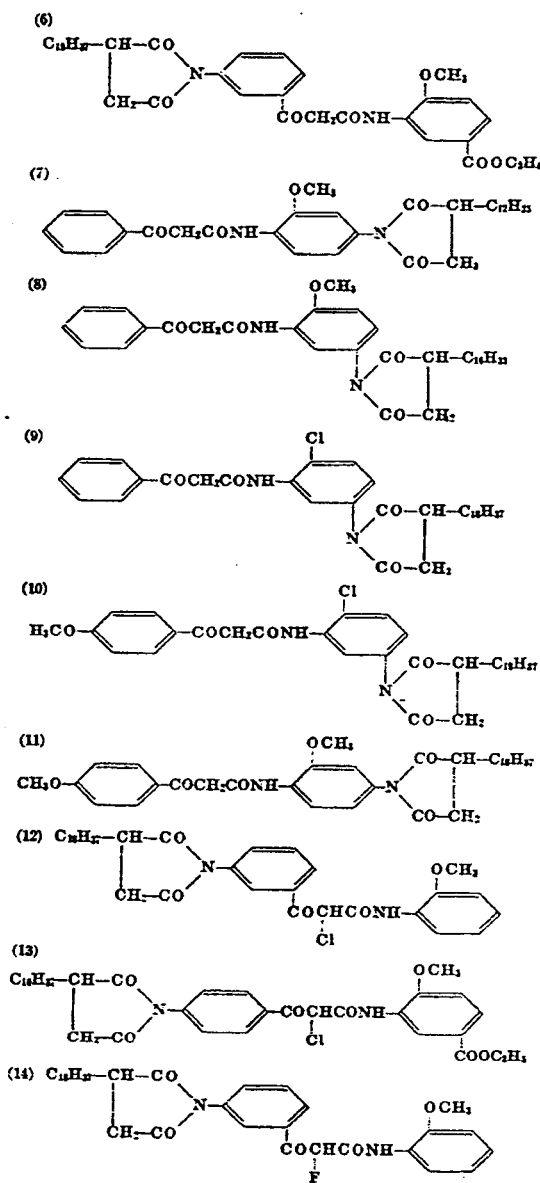

sensitive material of the present invention can be produced. In the above case, the amount of the coupler to be added to the silver halide photographic emulsion is preferably from 15 g. to 100 g. per mole of silver halide, but is not necessarily limited to said range.

The thus obtained light-sensitive material is exposed to light, is developed by means of a paraphenylenediamine-type developer and is then bleached, fixed and freed from silver to obtain a yellow dye image which is favorable in spectral absorption characteristics and has the maximum absorption around 440 mµ, and which is excellent in transparency and high in color density. Furthermore, since the image is less in deposition of the coupler, there is observed neither light absorption nor scattering, and the unexposed area is also excellent in transparency.

Typical developers employed for the development of the light-sensitive photographic materials of the present invention are sulfates, sulfites and hydrochlorides of:

N,N-diethyl-p-phenylenediamine,
N-ethyl-N-β-methanesulfonamide-ethyl-3-methyl-4-aminoaniline,
N-ethyl-N-hydroxyethyl-p-phenylenediamine,
N-ethyl-N-hydroxyethyl-2-methyl-p-phenylenediamine, and
N,N-diethyl-2-methyl-p-phenylenediamine.

The yellow couplers employed in the present invention are synthesized in the following manner:

A benzoyl acetanilide derivative having a primary amino group is condensed with a long-chain alkyl succinic anhydride. The resulting succinmonoamide is heated together with a sulfuric acid-acetic acid mixture and is dehydrated and ring-closed. The reaction product is purified according to a suitable procedure, whereby a high-purity coupler is easily obtained. Further, when this coupler is treated with sulfuryl chloride in an inert solvent, a chlorine-substituted compound of active methylene is obtained. The long-chain alkyl succinic anhydride, which is the main starting material, is disclosed in "Dai Yuki Kagaku (Grand Organic Chemistry)" Vol. 4, page 366, (published by Asakura Shoten), and is a compound which has been produced on commercial scale by use of a malonic acid ester, a long-chain alkyl halide or the like.

Concrete processes for synthesizing typical yellow couplers among those exemplified previously which are used in the present invention are shown below.

SYNTHESIS EXAMPLE 1

10 g. of α-(3-n-dodecyl succinmonoamido benzoyl)-acetanilide (m.p. 163°–164° C.), which has been synthesized from α-(3-aminobenzoyl)-acetanilide and n-dodecyl succinic anhydride, is mixed with a solution of 60 ml. of glacial acetic acid and 6 ml. of concentrated sulfuric acid, and the mixture is heated at 70°–75° C. for 10 minutes. Thereafter, the reaction liquid is charged into 500 ml. of water, whereby a white precipitate is formed.

This precipitate is dissolved in 200 ml. of ethyl acetate, and the ethyl acetate solution is washed with water, is charged with anhydrous sodium sulfate, and is allowed to stand overnight to be dehydrated. When ethyl acetate is removed by distillation, an oily substance is left. This oily substance is recrystallized from 100 ml. of acetonitrile to obtain a white powder (yield 63.5 percent). This powder is the coupler exemplified as (1). The elementary analysis values of this coupler are as shown below.

In producing light-sensitive color-photographic materials by use of the above-mentioned yellow couplers of the present invention, any of the conventionally known processes may be employed. For example, the yellow coupler of the present invention is dissolved in a high-boiling solvent having a boiling point above 180° C., (e.g. tricresyl phosphate, dibutyl phthalate, or the like), or in a mixed solvent thereof with a low-boiling solvent such as butyl acetate, butyl propionate, or the like, and then the solution is mixed with an aqueous gelatine solution containing a surface active agent. Subsequently, the solution is emulsified by means of a high-speed rotary mixer or a colloid mill. The resulting emulsified liquid is directly added to a silver halide photographic emulsion, is applied onto a suitable support, such as a film base or baryta paper, and is then dried to remove a major proportion of the low-boiling solvent. Alternatively, the above-mentioned emulsified liquid is once cold set, finely cut and washed with water to remove the low-boiling solvent, is added to a silver halide photographic emulsion, is applied onto a suitable support as mentioned above, and is then dried. In the above-mentioned manner, the light-

ELEMENTARY ANALYSIS

| Coupler | M.P. (°C.) | Calculated | | | Found | | |
|---|---|---|---|---|---|---|---|
| | | C | H | N | C | H | N |
| Exemplified as (1) | 107–108 | 73.78 | 7.99 | 5.55 | 73.51 | 7.71 | 5.27 |

SYNTHESIS EXAMPLE 2

90 g. of α-(3-n-octadecyl succinmonoamido benzoyl)-2-methoxy acetanilide (m.p. 169° C.), which has been synthesized from α-(3-aminobenzoyl)-2-methoxy acetanilide and n-octadecyl succinic anhydride, is mixed with a solution of 540 ml. of glacial acetic acid and 54 ml. of concentrated sulfuric acid, and the mixture is heated at 70°–75° C. for 10 minutes. Thereafter, the reaction liquid is charged into 4 L. of water, whereby a white precipitate is formed. This precipitate is dissolved in benzene. The benzene solution is washed with water, is charged with anhydrous sodium sulfate, is allowed to stand overnight. When benzene is removed by distillation, an oily substance is left. The oily substance is recrystallized from 500 ml. of ethyl alcohol to obtain 80 g. of a white powder (yield 92.4 percent). This powder is the coupler exemplified as (2).

According to the same synthesis process as above, there are obtained:

the coupler exemplified as (3) from α-(4-n-hexadecyl succinmonoamido benzoyl)-2-methoxyacetanilide, the coupler exemplified as (4) from α-(3-n-octyl succinmonoamido benzoyl)-2-phenoxyacetanilide, the coupler exemplified as (5) from α-(3-n-octadecenyl succinmonoamido benzoyl)-2-chloroacetanilide, and the coupler exemplified as (6) from α-(3-n-octadecyl succinmonoamido benzoyl)-2-methoxy-5-ethoxycarbonyl acetanilide.

The 3 points and elementary analysis values of the couplers (2) to (6) are shown in the following table:

ELEMENTARY ANALYSIS

| Coupler | M.P. (°C.) | Calculated | | | Found | | |
|---|---|---|---|---|---|---|---|
| | | C | H | N | C | H | N |
| Exemplified as (2) | 51–52 | 73.75 | 8.80 | 4.53 | 73.54 | 8.63 | 4.91 |
| Exemplified as (3) | 101–102 | 73.18 | 8.53 | 4.74 | 72.91 | 8.33 | 4.50 |
| Exemplified as (4) | 110–112 | 73.31 | 6.71 | 5.18 | 73.01 | 6.50 | 4.89 |
| Exemplified as (5) | 93–94 | 71.82 | 7.95 | 4.51 | 71.30 | 8.15 | 4.59 |
| Exemplified as (6) | 103–104 | 71.27 | 8.46 | 4.09 | 71.15 | 8.30 | 3.80 |

SYNTHESIS EXAMPLE 3

10.0 g. of α-benzoyl-4-n-dodecyl succin monoamido-2-methoxyacetanilide, which has been synthesized from α-benzoyl-4-amino-2-methoxyacetanilide and n-dodecyl succinic anhydride, is heated at 75°–80° C. for 5 minutes together with a solution of 60 ml. of glacial acetic acid and 6 ml. of concentrated sulfuric acid, and then the reaction liquid is charged into 600 ml. of water. A separated precipitate is dissolved in ethyl acetate, and the ethyl acetate solution is washed with water and is then dried with anhydrous sodium sulfate. After removing ethyl acetate, the remaining solid is recrystallized from alcohol to obtain 5.0 g. of a white powder (yield 51.8 percent). This powder is the coupler exemplified as (7).

According to the same process as above, there are obtained the coupler exemplified as (8) from α-benzoyl-5-n-hexadecyl succinmonoamido-2-methoxyacetanilide, the coupler exemplified as (9) from α-benzoyl-5-n-octadecyl succinmonoamido-2-chloroacetanilide, the coupler exemplified as (10) from α-(4-methoxybenzoyl)-5-n-octadecyl succinmonoamido-2-chloroacetanilide, and the coupler exemplified as (11) from α-(4-methoxybenzoyl)-4n-octadecyl succinmonoamido-2-methoxyacetanilide.

The melting points and elementary analysis values of the couplers (7) to (11) are as shown in the following table:

ELEMENTARY ANALYSIS

| Coupler | M.P. (°C.) | Calculated | | | Found | | |
|---|---|---|---|---|---|---|---|
| | | C | H | N | C | H | N |
| Exemplified as (7) | 90–91 | 71.88 | 7.92 | 5.24 | 71.69 | 7.68 | 5.01 |
| Exemplified as (8) | 60–62 | 73.18 | 8.53 | 4.74 | 72.92 | 8.31 | 4.51 |
| Exemplified as (9) | 44–45 | 71.29 | 8.24 | 4.49 | 71.26 | 8.42 | 4.56 |
| Exemplified as (10) | 81–82 | 69.85 | 8.17 | 4.28 | 69.86 | 8.30 | 4.30 |
| Exemplified as (11) | 105–106 | 72.19 | 8.70 | 4.32 | 72.43 | 9.27 | 4.58 |

SYNTHESIS EXAMPLE 4

20.0 g. of the coupler exemplified as (2) is dissolved in 200 ml. of chloroform. To the solution, 10.0 g. of sulfuryl chloride is added dropwise at 5°–10° C., and the mixture is stirred at 10°–15° C. for 2 hours. Thereafter, the solvent is removed by distillation under reduced pressure at normal temperature, and the remaining solid is recrystallized 2 times from 200 ml. of acetonitrile to obtain 10.0 g. of a yellowish-white powder (yield 48 percent). This powder is the coupler exemplified as (12).

In the same manner as above, the coupler exemplified as (13) is obtained from α-(4-n-octadecyl succinimido benzoyl)-2-methoxy-5-ethoxycarbonyl acetanilide.

ELEMENTARY ANALYSIS

| Coupler | M.P. (°C.) | Calculated | | | | Found | | | |
|---|---|---|---|---|---|---|---|---|---|
| | | C | H | N | Cl | C | H | N | Cl |
| Exemplified as (12) | 42–43 | 69.86 | 8.18 | 4.29 | 5.43 | 69.83 | 8.47 | 4.02 | 5.15 |
| Exemplified as (13) | 63–64 | 67.88 | 7.92 | 3.86 | 4.88 | 67.61 | 7.71 | 3.68 | 4.62 |

Next, comparisons in melting point between couplers having long-chain alkyl succinimido groups which are used in the present invention and known couplers similar in structure thereto are shown in the following tables: Table 1. Comparison in melting point between the coupler exemplified as (2) among those employed in the present invention and known couplers similar in structure thereto.

| Coupler | Structural formula | M.P. (°C.) |
|---|---|---|
| Exemplified as (2) | $C_{18}H_{37}$—CH—CO\\N—[ring]—COCH$_2$CONH—[ring-OCH$_3$] / CH$_2$—CO | 51–52 |
| Coupler disclosed in U.S. Pat. 2,875,057 | $_tC_5H_{11}$—[ring]—OCH$_2$CONH—[ring]—COCH$_2$CONH—[ring-OCH$_3$] / $_tC_5H_{11}$ | 126–127 |
| Coupler disclosed in Japanese patent publn. No. 2,837/64 | $C_{18}H_{37}$CO\\NCH$_2$CH$_2$CONH—[ring]—COCH$_2$CONH—[ring-OCH$_3$] / $C_4H_9$ | 110 |

TABLE 2

Comparison in melting point between the coupler exemplified as (8) among those employed in the present invention and a known coupler similar in structure thereto

| Coupler | Structural formula | M.P. (° C.) |
|---|---|---|
| Exemplified as (8) | ⟨phenyl⟩—COCH₂CONH—⟨phenyl(OCH₃)⟩—N(CO—CH—C₁₆H₃₃)(CO—CH₃) | 60–62 |
| Coupler disclosed in U.S. Pat. 2,801,171 | ⟨phenyl⟩—COCH₂CONH—⟨phenyl(OCH₃)⟩—NHCOCH₂O—⟨phenyl(tC₅H₁₁)(tC₅H₁₁)⟩ | 132–134 |

As is clear from the above tables, the couplers employed in the present invention are far lower in melting point than the known couplers, and hence do not crystallize in emulsions and in films formed after application thereof to supports and drying. Accordingly, the present couplers give stabilized light-sensitive photographic materials excellent in transparency.

Further, test results showing the excellent solubilities of the present couplers for high-boiling solvents are shown in the tables below. In each test, the comparison in solubility was effected by measuring the temperature at which 1 g. of coupler was dissolved in 2 ml. of dibutyl phthalate.

TABLE 3

Comparison in solubility between the coupler exemplified as (2) among those employed in the present invention and a known coupler similar in structure thereto

| Coupler | Structural formula | Dissolved temperature (° C.) |
|---|---|---|
| Exemplified as (2) | C₁₆H₃₃—CH—CO / CH₃—CO \ N—⟨phenyl⟩—COCH₂CONH—⟨phenyl(OCH₃)⟩ | 40 |
| Coupler disclosed in U.S. Pat. 2,875,057 | tC₅H₁₁—⟨phenyl(tC₅H₁₁)⟩—OCH₂CONH—⟨phenyl⟩—COCH₂CONH—⟨phenyl(OCH₃)⟩ | 80 |

TABLE 4

Comparison in solubility between the coupler exemplified as (8) among those employed in the present invention and a known coupler similar in structure thereto

| Coupler | Structural formula | Dissolved temperature (° C.) |
|---|---|---|
| Exemplified as (8) | ⟨phenyl⟩—COCH₂CONH—⟨phenyl(OCH₃)⟩—N(CO—CH—C₁₆H₃₃)(CO—CH₃) | 70 |
| Coupler disclosed in U.S. Pat. 2,801,171 | ⟨phenyl⟩—COCH₂CONH—⟨phenyl(OCH₃)⟩—NHCOCH₂O—⟨phenyl(tC₅H₁₁)(tC₅H₁₁)⟩ | 100 |

As is clear from the above test results, the couplers employed in the present invention are excellent also in solubility for high-boiling solvents as compared with the known couplers, and hence are markedly useful as protected couplers. Moreover, they have such advantages as the increase in color density of developed color intensity and the reduction in amount of couplers to be used. Accordingly, the light-sensitive photographic materials of the present invention have excellent photographic characteristics in color reproduction, graininess, and the like.

The present invention is illustrated below with reference to examples, but the examples are mere illustrative and the invention is by no means limited thereto.

EXAMPLE 1

200 g. of the coupler exemplified as (2) was added to a mixed solution comprising 200 ml. of dibutyl phthalate and 600 ml. of butyl acetate. The resulting mixture was heated up to 80° C. to have the coupler completely dissolved. This solution was mixed with 100 ml. of a 10 percent aqueous solution of Alkanol B (alkylnaphthalene-sulfonate; a product of E. I.

du Pont de Nemours & Co.) and with 2.000 ml. of a 5 percent aqueous gelatine solution, and the mixture was passed through a colloid mill to form a dispersion.

The thus formed coupler dispersion was added to 10 kg. of a high-speed gelatino silver iodobromide emulsion. This emulsion was applied onto a film base, and was then dried to obtain a light-sensitive photographic material having a stable light-sensitive layer.

After exposure to light, the above light-sensitive material was developed at 20° C. for 10 minutes by means of a developer having the following composition:

| | |
|---|---:|
| N,N-Diethyl-p-phenylenediamine hydrochloride | 2.5 g. |
| Anhydrous sodium sulfite | 2.0 g. |
| Sodium carbonate (monohydrate) | 82.0 g. |
| Potassium bromide | 2.0 g. |
| Water to make | 1,000 ml. |

Subsequently, the material was subjected to stopping and fixing treatments according to an ordinary procedure, was washed with water for 10–15 minutes, and was then treated for 5 minutes with a bleaching bath of the following composition:

| | |
|---|---:|
| Potassium ferricyanide | 100 g. |
| Potassium bromide | 50 g. |
| Water to make | 1,000 ml. |

The material was further washed with water for 5 19 minutes and was fixed for 5 minutes in a fixing bath comprising:

| | |
|---|---:|
| Sodium thiosulfate (pentahydrate) | 250 g. |
| Water to make | 1,000 ml. |

Thereafter, the fixed photographic material was washed with water for 20–25 minutes and was then dried to obtain a brilliant yellow dye image having the maximum absorption at 440 m$\mu$.

EXAMPLE 2

100 g. of the coupler exemplified as (8) was added to a mixed solution comprising 100 ml. of tricresyl phosphate and 300 ml. of butyl acetate. The resulting mixture was heated up to 60° C. to have the coupler completely dissolved. This solution was mixed with 50 ml. of a 10 percent aqueous Alkanol B solution and with 2,000 ml. of a 5 percent aqueous gelatine solution, and the mixture was passed through a colloid mill to form a dispersion.

This dispersion was added to 5 kg. of a gelatino silver iodobromide emulsion, which was applied onto a film base and was then dried to obtain a light-sensitive photographic material having a stable light-sensitive layer.

This film was exposed to light and was developed at 20° C. for 10 minutes by means of a developer having the following composition:

| | |
|---|---:|
| Methol | 3.0 g. |
| Anhydrous sodium sulfite | 60.0 g. |
| Hydroquinone | 6.0 g. |
| Anhydrous sodium carbonate | 50.0 g. |
| Potassium bromide | 1.0 g. |
| Water to make | 1,000 ml. |

After subjecting to ordinary stopping, hardening treatment and water-washing, the film was again exposed to white light. Subsequently, the film was developed at 20° C. for 12 minutes with a developer of the following composition:

| | |
|---|---:|
| N,N-Diethyl-p-phenylenediamine hydrochloride | 5.0 g. |
| Anhydrous sodium sulfite | 2.0 g. |
| Sodium carbonate (monohydrate) | 82.0 g. |
| Potassium bromide | 1.0 g. |
| Water to make | 1,000 ml. |

Thereafter, the film was subjected to stopping, fixing, water-washing and bleaching, was washed with running water for 20 minutes, and was then dried to obtain a yellow positive dye image excellent in transparency which had the maximum absorption at 445 m$\mu$.

EXAMPLE 3

100 g. of the coupler exemplified as (12) was mixed with 200 ml. of dibutyl phthalate. The resulting mixtures was heated up to 50° C. to have the coupler completely dissolved. This solution was mixed with 50 ml. of a 10 percent aqueous Alkanol B solution and with 2,000 ml. of a 5 percent aqueous gelatine solution, and the mixture was passed several times through a colloid mill to form a dispersion.

The dispersion was added to 5 kg., of a gelatino silver chlorobromide emulsion, which was applied onto a baryta paper and then dried to obtain a light-sensitive material.

The thus obtained light-sensitive material was exposed to light and was then developed at 20° C. for 10 minutes in a bath of the following composition:

| | |
|---|---:|
| N-Ethyl-N-hydroxyethyl-p-phenylenediamine sulfate | 2.5 g. |
| Anhydrous sodium sulfite | 2.0 g. |
| Hydroxyamine hydrochloride | 1.0 g. |
| Sodium carbonate (monohydrate) | 82.0 g. |
| Potassium bromide | 2.0 g. |
| Water to make | 1,000 ml. |

Subsequently, the developed material was dipped in a stopping bath comprising 10 ml. of glacial acetic acid, 3.0 g. of caustic soda and 1,000 ml. of water. Immediately thereafter, the treated material was immersed for 4 minutes in an acidic fixing solution. The fixed material was washed with water for 10 minutes, and was then bleached at 20° C. for 8 minutes in a bath of the following composition:

| | |
|---|---:|
| Disodium ethylenediamine tetraacetate | 40.0 g. |
| Ferric chloride | 30.0 g. |
| Sodium carbonate (monohydrate) | 20.0 g. |
| Potassium bromide | 30.0 g. |
| Sodium thiosulfate (pentahydrate) | 200.0 g. |
| Water to make | 1,000ml. |
| | 1,000 | the thus treated light-sensitive material was washed with water for 20 minutes, was dipped in a stabilizing bath for 2 minutes, and was then dried to obtain a yellow dye image having the maximum absorption at 440 m$\mu$ which was excellent in fastness to light, heat and humidity.

What we claim is:

1. A light-sensitive color-photographic silver halide material characterized by containing a compound represented by the general formula

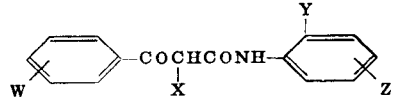

wherein Z is a hydrogen atom or a halogen atom; Y is a hydrogen atom, a lower alkoxy group, an aryloxy group or a halogen atom; W is

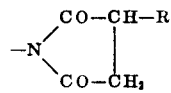

a hydrogen atom or a lower alkoxy group; and Z is

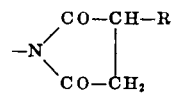

a hydrogen atom or a lower alkoxycarbonyl group, provided either one of Z and W is always

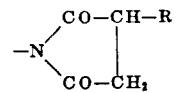

and both of them cannot be

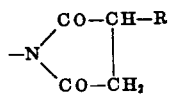

at a same time, where R is an aliphatic hydrocarbon residue having eight to 20 carbon atoms.

2. A light-sensitive color-photographic silver halide material as claimed in claim 1, wherein said compound is represented by the formula

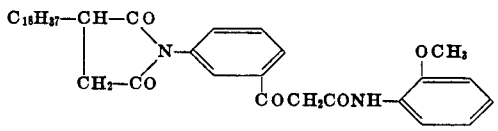

3. A light-sensitive color-photographic silver halide material as claimed in claim 1, is wherein said compound is represented by the formula

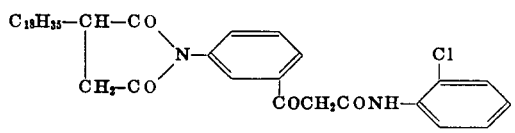

4. A light-sensitive color-photographic silver halide material as claimed in claim 1, wherein said compound is represented by the formula

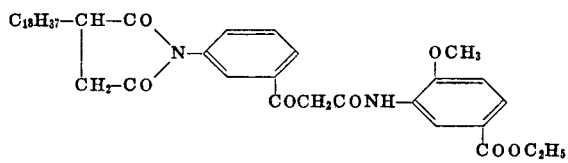

5. A light-sensitive color-photographic silver halide material as claimed in claim 1, wherein said compound is represented by the formula

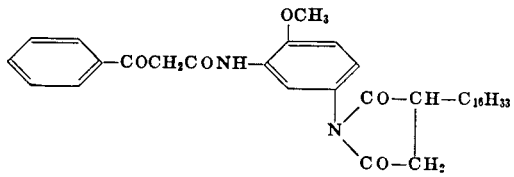

6. A light-sensitive color-photographic silver halide material as claimed in claim 1, wherein said compound is represented by the formula

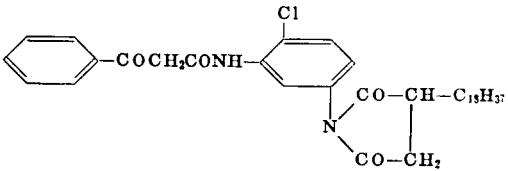

7. A light-sensitive color-photographic silver halide material as claimed in claim 1, wherein said compound is represented by the formula

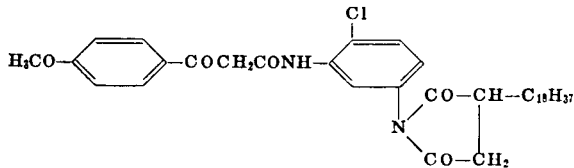

8. A light-sensitive color-photographic silver halide material as claimed in claim 1, wherein said compound is represented by the formula

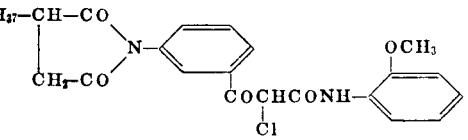

* * * * *